United States Patent
Roggatz (10) Patent No.: US 6,837,585 B2
(45) Date of Patent: Jan. 4, 2005

(54) COMPUTER PROCESSED INTEGRAL PHOTOGRAPHY APPARATUS AND PROCESS FOR LARGE 3D IMAGE PRODUCTION

(76) Inventor: Konstantin Roggatz, Haidekoppel 25, D-24558, Henstedt-Ulzburg (DE)

(*) Notice: Subject to any disclaimer, the term of this patent is extended or adjusted under 35 U.S.C. 154(b) by 222 days.

(21) Appl. No.: 10/076,610

(22) Filed: Feb. 19, 2002

(65) Prior Publication Data

US 2002/0122024 A1 Sep. 5, 2002

Related U.S. Application Data

(63) Continuation of application No. 09/214,511, filed as application No. PCT/EP97/04194 on Jan. 7, 1999, now abandoned.

(30) Foreign Application Priority Data

Aug. 6, 1996 (DE) .......................................... 196 31 695

(51) Int. Cl.[7] .............................................. G03B 21/14
(52) U.S. Cl. .............................. 353/94; 353/7; 359/23; 355/22; 396/324
(58) Field of Search ............................... 353/7, 10, 94, 353/122; 359/10, 12, 22, 23, 28, 30, 35, 463; 355/22, 54; 396/324

(56) References Cited

U.S. PATENT DOCUMENTS

| | | |
|---|---|---|
| 3,706,486 A | 12/1972 | Demontebello |
| 4,039,245 A | 8/1977 | Yano |
| 4,132,468 A * | 1/1979 | Lo et al. .......................... 353/7 |
| 4,732,453 A | 3/1988 | DeMontebello et al. |
| 5,191,449 A | 3/1993 | Newswanger |
| 5,245,448 A | 9/1993 | Waits |
| 5,521,724 A | 5/1996 | Shires |
| 5,581,402 A * | 12/1996 | Taylor .......................... 359/463 |
| 5,680,231 A | 10/1997 | Grinberger |
| 5,825,540 A | 10/1998 | Gold et al. |

FOREIGN PATENT DOCUMENTS

| | | |
|---|---|---|
| DE | 2 110 623 | 9/1971 |
| DE | 2 223 581 | 5/1973 |
| DE | 4004739 A1 | 8/1991 |
| DE | 19500699 A1 | 7/1996 |
| EP | 0007039 A1 | 1/1980 |
| GB | 1 346 915 | 2/1974 |

OTHER PUBLICATIONS

British Journal of Photography, Oct. 12, 1994, pp. 24–25.
Davies et al, "Three–Dimensional Imaging Systems: A New Development," Applied Optics, vol. 27, #21, Nov. 1, 1988, pp. 4520–4528.
Abstract of JP 1–214801(A), S. Miura, Patents Abstract of Japan, vol. 13, #524, Nov. 22, 1989, p. 964.
Davies et al., "Design and Analysis of an Image Ransfer System Using Microlens Arrays," Optical Engineering, vol. 33, No. 11, Nov. 1, 1994, pp. 3624–3633, XP000475106.

* cited by examiner

Primary Examiner—William C. Dowling
(74) Attorney, Agent, or Firm—Venable LLP; Chad C. Anderson (57) ABSTRACT

A set of enhanced apparatuses and a computer integrated processes are provided for creating large scale 3D integral photography images. A large number of mini projectors in a grid on top of each other and beside each other, are exposed individually with a computer calculated reverse (pseudoscopic) perspective image. The curved photo layer inside the projectors obtains sharp high resolution images through the achromatic behavior of the lens system. A guided back light system directs the light from the back through the diaphragm apertures.

23 Claims, 3 Drawing Sheets

COMPUTER PROCESSED INTEGRAL PHOTOGRAPHY APPARATUS AND PROCESS FOR LARGE 3D IMAGE PRODUCTION

CROSS REFERENCE TO RELATED APPLICATIONS

This application is a continuation in part of application Ser. No. 09/214,511 filed Jan. 7, 1999 now abandoned, which is a 371 of national stage Application No. PCT/EP97/04194 filed Jan. 7, 1999.

BACKGROUND OF THE INVENTION

1. Field of the Invention

This invention relates to an apparatus and a process for creating integral photography three-dimensional images, and more particularly, to a computer integrated process and optically improved and expanded apparatuses for creating integral photography three-dimensional images.

2. Description of the Related Art

A variety of systems for forming and viewing 3D images are known and can be grouped in the following groups: stereography, lenticular sheet imaging, auto-stereography, volumetric displays with fast rotating components, holotron technology, laser holography, and integral photography.

Stereography is often used in, for example, 3D cinema with shutter or polarised glasses. Lenticular sheet imaging is often used, for example, on flipping postcards. Auto-stereography includes eye tracking mechanisms adjusting lenticular sheets in front of LCD monitors. Other auto-stereography apparatuses use of lenticular sheets a diaphragm with numerous slit apertures instead of lenticular sheets. Holotron technology shows multiple perspectives in high frequency on a monitor. Laser holography is commonly used on credit cards.

The present invention relates integral photography, which has no popular application example today.

The integral photography is a concept to record a three dimensional scene on a photographic plate or wall. The plate consists of a multitude of individual lenses, placed beside and on top of each other. Every lens, with the photo layer behind it, functions as a miniature camera for recording the surrounding scene on the photo layer, as well as a miniature projector for projecting the recorded image on the photo layer out again into the surrounding. The spectator, looking on the ready picture wall, is looking into millions of small projectors, each projecting its 2D image directly into the spectator's eyes. The multitude of dots flowing into each other, when distantly observed, will turn into the previously recorded 3D image scene in the spectator's mind. The integral photography concept has not delivered any commercial use because a number of conceptual problems prevented the creation of satisfactory images.

The principle of integral photography includes the placement of many small lenses on top and beside of each other on a grid, each one recording and projecting a 2D image of the surrounding scene. When looking onto the grid of many lenses from a certain distance, the 3D image can be seen from any perspective within a certain range. The many small lenses on the grid are also referred here as the lens wall or picture wall The principle of integral photography has been known since the beginning of the $20^{th}$ century, but was never developed to a successful product because the proposed processes and apparatuses failed to deliver satisfactory images.

Past integral photography systems result in the following problems.

Prior art integral photography systems had to expose one complete lens wall with the original source in one shot, creating a pseudoscopic image. Pseudoscopic can be defined as reversed perspective, i.e., everything that should stick out actually sticks in. Only the exposure of a second lens wall with the pseudoscopic virtual image of the first lens created the normal perspective image. This two step process considerably reduces the image quality. Some prior art integral photography systems uses two lens walls behind each other with the imaging layer in between to integrate the two steps in one. The normal perspective image can be seen from the backside.

Prior art integral photography systems have problems correcting the following errors or achieving this features: uneven patterns in the backlit system; uneven patterns in the photo layer; uneven light towards the corners within a single lens; overlapping images on the image photo plane; and color intensity corrections; movement inside the image.

The individual exposure from an LCD monitor creates another new error source in that the distortion caused by the projection lens system between the LCD monitor and the individual lens during the exposure process must be corrected.

Prior art integral photography systems have severe problems with the planes being in focus. In fact, this issue is seen in the prior art as a paradox to the integral photography concept. On the one hand, the integral photography is intended to display objects in different distances to the observer. On the other hand, the small lenses on the lens wall can only be focused on one plane, either infinity or some closer plane, when recording the image. The resulting image can only be in focus in the single plane, making the whole approach useless. It was actually this paradox that inhibited the development of integral photography.

Most prior art systems only create poor image quality, with the photo layer being flat at the back of the lenses. U.S. Pat. No. 3,706,486 to Roger de Montebello shows two lens arrangement aspects necessary to obtain reasonable image resolutions. The photo layer at the back of the lens is spherical and in the center between front lens and photo layer was the diaphragm.

SUMMARY OF THE INVENTION

The computer calculated image of the present invention is always in focus, no matter whether the displayed object is directly in front of the lens wall or in the far distance. In fact, the front view image is simply calculated and laid on top of the back view image and then projected together into the individual lens. The resulting virtual 3D image lets the observer always focus the eyes to infinity regardless of whether the object is right in front of the observer.

In comparison to prior art integral photography systems, the design of computer graphic scenes with movement and animation can be performed much more conveniently and cost efficiently on a desktop computer as opposed to real scenes in large studio or outdoor settings.

The present invention may use a separate optical media inside the lens system, especially between a front lens and a photo layer. This media can be different types of glass, plastics, glues or liquids. The separation is important for supplying access to the inside surface areas when building a compact lens wall module. The separation is optically even more important for achromatic behavior of the lens system, i.e., to correct the optical color error in order to improve image resolution.

The new invention also includes an additional lens surface between the two media mentioned above. This correction of the color error accounts for about 100 times (10×10) higher 3D image resolution. The correction of the color error is especially important when using different plastic materials with comparatively high color error properties for the mass production of the lens wall modules.

The present invention features the concept of a guided backlight system for showing the final image. This is important for the improvement of the image quality, the power consumption, and the cost of light sources. The light should be guided in two steps. First, the light is guided from point light sources to a wide spanned array of parallel light rays, hitting the lens wall from the back. The second step is to focus and guide the parallel light rays evenly through the photo layer and then through the diaphragm apertures and the lenses. These two steps can also be integrated into one, more complex lens system with additional lens surfaces to save production cost and for correcting color errors in the aspheric lens.

Prior art integral photography systems with no diaphragm integrated in the lens did not need guided backlight systems because they were illuminated by deffuse light from the front or from the back.

For the first step in the backlight system, a system of prisms is described to create the above-mentioned array of parallel light rays in a flat construction. The particular embodiment is described more for the sake of completeness of the whole system and for the understanding of the concept of parallel back light. Other arrangements can be designed.

For the second step in the backlight system of the new invention, an aspheric lens is used to focus the rays through the diaphragm aperture. For the purpose of flat construction, a Fresnel-type lens of this aspheric lens can be used. As stated above, it is possible to integrate the above two steps into one, by designing the Fresnel-type lens plate such that a few point light sources focus directly on the multitude of diaphragm apertures.

The division of the lens wall into many small tiles or modules makes it easy to manufacture, expose, develop, ship and assemble the lens wall.

Movement or animation of the picture can be achieved by exposing the lens wall with a sequence of multiple pictures for different viewing angles. This process is known from laser holography. In the present invention, the different images are calculated and composed during the process of computer exposure by the graphic computer. It can be included in software provided as part of the product.

At least two features are utilized to add movement to the picture. As the first feature, the transputer approach has the spherical photo layer replaced by a miniature LCD display. A computer that controls the LCD calculates the image of one or more LCDs integrated near the LCD on the lens wall module. Many such computers, reduced to a single chip layer, are placed on the module and connected in transputer style to synchronize, access and communicate the same symbolic image scene representation or to simply store and control LCD image sequences. The lens wall modules are also connected together to one main computer controlling the time path of a symbolic image scene or a stored image sequences.

In the second approach, the multi-dimensional photo layer approach, the spherical photo layer includes many thin layers or particles, each one sensitive for recording or reading out only under certain conditions, which can be imposed from outside. One of such conditions can be the very distinct range of light frequencies being used for exposure and later as a background light. Three colors, each one within the range of red, green or blue, compose a full color picture. For showing the animation, the backlight source should compose the three related frequencies and change to the next three frequencies within the desired time steps.

The present invention includes the option of placing a prism in front of each lens on the lens wall to form an array of prisms. The prisms divert light towards the spectators if the lens wall is placed flat on a building, where it can not be seen directly from the front. The prisms can also divert light to lenses to the right and to lenses to the left, in order to increase the viewable range for the picture.

The present invention incorporates the concept of dividing the necessary elements between the recording device and the recorded element. This enables different kinds of divisions during exposure and showing. One example is to move all elements during the exposure time to the exposing machine, leaving only the curved photo layer as the exposed device. At show time and after photo development, the photo layer is then placed into a showing module containing the optical elements to show the image. Another example is to move all necessary optical elements for viewing, like the front lenses and the back light system on the exposed device module. At this point, the recording device is carrying only the elements necessary for recording, like a transition lens and the LCD monitor. For showing the images after the photo layer has been developed, the exposed device module only needs to be mounted because it already contains the necessary devices.

The apparatus described herein leads the lens wall modules through the process of individual exposure with the computer calculated LCD image. For this purpose, the lens wall modules should be stored in a light safe container. This container should be docked onto the machine, so that the machine can take one individual lens wall module, place it on a tray under the LCD monitor and the respective optics, and expose every individual lens one after each other with the individual computer calculated image. The ready exposed lens wall modules are then placed into a different or the same container, or handed over to the photographical developing machine.

An alternative embodiment of the machine leads the lens wall modules through the process of photochemical development of the photo layer. Again, the lens wall modules are stored in a light safe container or handed over by the exposing machine. The individual modules are placed into the respective chemical baths, rinsed, dried, marked and placed into the container again.

A variation of the lens wall optical behavior is described herein. During showing time, this variation needs a single strong light source, placed at a well defined position in front of the wall. No backlight system is needed. For this variation, the spherical photo layers must be featured with a mirror from the back. Only when exposing the photo layer, the front lenses and the diaphragm are placed in front of the spherical photo layer. For every individual sphere, the image is calculated by the computer, taking the exact future position of the light source into the calculation. When showing the image, the light source shines on the multitude of spherical mirrors, each one bouncing the light back into the spectators eyes. The photo layer on the mirror changes the color with respect to the viewing position. More than one light source or a diffused light reduces the quality of the picture.

In another embodiment, the optical behavior of the front lens or prism is neutralized by inserting an optical liquid between a layer and the lens or prism.

A light absorbing layer may also be behind the photo layer of the lens array during exposure time. This prevents neighboring photo layer cells to be exposed by diffused light.

Another option of how to handle the colors while maintaining high image resolution is shown. Instead of correcting the color error within the single lens, three lenses are adjusted in focal length to focus one of the RGB colors. Each of the lenses is equipped with a respective color filter during exposure and presentation.

For increasing the dot resolution of the lens wall, it is described to place many smaller lenses in front of the lens wall.

The improvements described herein improve the image resolution of the apparatus to the limits imposed by the diffraction behavior of light. The image quality is very good, enabling images to reach far inside and outside the lens wall. The lens modules, the machines and the software can be developed and produced with current mainstream technologies. The images can be designed by the customer from the convenience of a standard desktop computer, and can be processed efficiently in a small place. The price for a system is competitive, especially when compared with other and much more simple technologies used to show all kinds of illuminated signs and billboards.

An optical filter wall converts an original image source to a psoudoscopic image. Another feature opens and closes the diaphragm inside the lens wall by a magnetic mechanism when exposing the wall with an image.

The invention includes both a process and an apparatuses for the invented computer integrated integral photography system.

The process and apparatus for producing a large integral photography image of an object includes a plurality of image projectors located in a grid horizontally next to each other and vertically one over the other. The optical components of the individual projectors include a diaphragm aperture, at least one lens surface, and at least one curved photo coated imaging surface with the space between lens and the imaging surface consisting of at least two different optical substances, like one fixed and one separate liquid substance. The optical components are arranged so that an image in front of each individual projector can be projected on the photo coated imaging surface inside the projector. A computer integrated exposing process includes a "recording projector" including some of the above optical components and a "showing projector" including some of the above optical components. The optical components are arranging during exposure and during showing so that a computer calculated picture on a monitor can be projected on the imaging surface inside the projector during exposure, and can be projected out again when showing the image. Every individual projector is exposed with an individual computer calculated picture one after each other. The necessary special perspective is calculated by the computer. The errors caused by the optical system are calculated and corrected by the computer. The empty spaces inside the projectors are filled or emptied with optical mediums. The photo coating imaging surfaces are photographically developed through an access space. A back light system includes a parallel light front hitting the "showing projectors" from the back and at least one lens surface behind the imaging surface for focusing or spreading the parallel light from the back. The path of the parallel light front is focused or spread at the lens surface, shining through the photo coated imaging surface, through the outer lens and into the open space.

The apparatuses for producing a large integral photography image of an object includes a plurality of image projectors located in a grid horizontally next to each other and vertically one over the other. The process and apparatus includes optical components of the individual projectors having a diaphragm aperture, at least one lens surface, and at least one curved photo coated imaging surface, with the space between lens and the imaging surface having at least two different optical substances, like one fixed and one separate liquid substance. The optical component is arranged so that an image in front of each individual projector is projected on the imaging surface inside the projector. A computer integrated exposing apparatus includes a "recording projector" including some of the above optical components and a "showing projector" including some of the above optical components. The optical components is arranged during exposure and during showing so that a computer calculated picture on a monitor is projected on the imaging surface inside the projector during exposure, and projected out again when showing the image. Every individual projector is exposed with an individual computer calculated picture one after each other. The necessary special perspective of the individual image is calculated by the computer. The errors caused by the optical system by calculating the corrections into the individual image are adjusted by the computer. Empty spaces inside the projectors are filled or emptied with optical mediums. The photo coated imaging surfaces are photographically developed through an access space. A back light system includes a parallel light front hitting the "showing projectors" from the back, at least one lens surface behind the imaging surface for focusing or spreading the parallel light from the back, with the path of the parallel light front, being focused or spread at the lens surface, shining through the photo coated imaging surface, through the outer lens and into the open space.

A miniature computer and miniature LCD are integrated in the "showing projector" and includes a miniature LCD display layer replacing the photo coating of the imaging surface, and a miniature computer integrated on a collection of projectors forming one module. The computer controls the collection of LCD's on the module and calculates the individual images with corrected perspective. The LCD's keeps the image information like a memory. The computers on the modules are connected with each other in order to work together.

The optical elements of the individual projectors are placed more specifically as follows: one spherical lens surface at the front; one diaphragm aperture behind the lens; one curved photo coated imaging surface; following exactly the image focusing dish of the optical system; an open space between the diaphragm and the imaging surface filled with an other optical medium like a liquid; and an aspheric type of lens surface behind the imaging surface focusing parallel light from the back exactly into the aperture of the diaphragm.

The diaphragm aperture is opened and closed with a diaphragm plate. A diaphragm plate can be moved to the side to open or close all apertures together. A spring pushes the plate to one side, and magnets on the plate allow an electrical magnet to move the plate from outside.

The front lens of the individual projectors may be neutralizing with an optical liquid during exposure with the respective exposing machine. Optical components of the individual projectors include a protection glass layer at the front, a spherical lens surface behind the glass layer, a space between the glass layer and the lens surface is only filled with an optical liquid during exposure, a photo coated curved imaging surface behind the lens surface, shaped with respect to the optical properties of the "exposing projector" and the lens system in the front, and another different optical medium being filled between the front lens and the imaging surface. The back light system includes a parallel light front hitting the "showing projectors" from the back, and an aspheric lens surface behind the imaging surface focusing the parallel light to one point and projecting it out. The computer integrated exposing process includes a "recording projector" precisely controlled by a computer for exposing each individual imaging surface with the image, which is calculated in correct perspective and with the adjustments of this specific optical system. The monitor in the "recording projector" is curved in order to give the projected image a stronger curve shape.

The apparatus can flood all the individual projectors with parallel light from the back, using an optical system with prisms.

The backlight system can include a chain of rhomboid prisms assembled in a grid. The rhomboid prisms are glued together, using glue with a higher refractive index then the rhomboid material. Partially and fully reflecting layers are applied to the prisms. A strong light source is distributed relatively evenly among the grid segments. The light stream can be partially reflected at the glued adages by 90° to the front. The light stream can flow a second time through the system after reaching the last rhomboid prism cell.

The edge cells of the rhomboid prism grid may reflect the main light stream 90° to one side and one fraction of the light stream 90° to the front. The rhomboid prisms are cut twice diagonally. Fully and partially reflecting mirror layers are applied to the surfaces. The two diagonal cuts are glued together again.

The individual mini projectors may be grouped together to handy rectangular modules. Individual projectors may be grouped into rectangular modules. The lenses of the mini projectors may be grouped into lens plates. The plates can be glued together with retaining sticks. Lockable apertures give access to the inner space in order to fill in the photographic developing chemicals or optical substances.

Interfering reflections may be avoided during exposure by placing a dark opaque substance some ware behind the imaging surface. A dark opaque liquid is filled into the hollow space between aspheric lens surface and the backlight prism system prior to the development.

An optical plate with prisms can be placed in front of the module to direct the image more towards the direction of the spectators. An optical plate surface at the front side of the projector module is provided. A diverting prism on the optical plate in front of each projector is provided. Alternating prism deviations to the right and to the left and downwards align an optimal visual field. A slight curvature at one side of the prism compensates for a slight distortion.

Three individual projectors can be optimized for recording and projecting each only one of the three alternating basic colors red, green and blue. Red, green and blue are assigned to a separate projector in alternating order. Color filters are applied for the assignment. The imaging surface, the front lens and the photo layer are adjusted to the corresponding wavelength.

Every individual projector can be optimised for recording and projecting the whole color spectrum while adjusting the imaging surface, the front lens and the photo layer to the entire light spectrum.

A lens plate with several lenses can be arranged in front of each individual projector in order to increase the point resolution.

A perspective conversion wall may be needed for the live (non computerised) exposure of the apparatus converting the view on a real object, to the inverted (pseudoscopic) view on that object, when this wall is placed between object and viewer. A plurality of individual deviating bodies can be arranged to a filter wall in a grid horizontally next to each other and vertically one over the other. Each body includes a glass body with two mirror surfaces embedded, cutting each other vertically. Both mirror surfaces stand vertically towards the wall plane. A diaphragm aperture is located at the intersection point of the two mirror surfaces.

The filter wall plate can be suspended between two plates with a lubricating agent such that it is easily movable, in order to increase the resolution during recording.

The apparatus and process can replace the backlight system with a single strong light source from the front and the curved imaging surface with a mirror. The photo layer can be on top of the mirror. A strong light source can shine obliquely from the front onto the mirrors during reproduction, in order to project images on the mirror surface into the room. A single point exposure with a computer calculated image is provided. The computer calculated image can be calculated with respect to the position of the reproduction light source.

An automatic exposing machine and the process for the computerized exposure of the modules described above includes a module reservoir, a precision track, a large exposure screen, an objective, a diaphragm aperture and a controlling computer. The image modules are automatically taken from the reservoir. The image modules are put on the precision track, being guided by the computer in front of the objective of the large exposure screen. The computer calculates the image, opens and closes the diaphragm, and continues with the next miniature projector The automatic developing machine for the modules also includes taking not developing image modules automatically from a reservoir and develop them in the absence of light. Liquid substances may be filled or emptied in the module, if needed. The photo developing chemicals and rinses are introduced sequentially into the module. The modules are sealed. The modules are marked as developed. The modules are pushed into the reservoir and the apparatus continues with the next module Further lenses from different materials may be added in order to increase the image resolution. The front lens surfaces (for the bundling of incident object beams) forms two or more lenses. The rear aspherical lens surfaces (for the bundling of the projection light arriving from behind) forms two or more lenses. The additional lenses have such a shape and such a reflective index that they largely correct the color error, opening error and further imaging errors.

Several images may be memorized on the individual imaging surfaces for the reproduction of a short cyclic movement sequence of the overall image scene by having the imaging surfaces coated with a plurality of different photosensitive layers. Three layers (RGB) for each individual image are exposed during the exposure and read out during image reproduction, without exposing or reading out the other layers. The individual layers are brought to sensitisation or reading out by the property of the light or other signals.

The separating signal may be the distinct wavelength of the used light. Each of the many photosensitive layers reacts photosensitively only to a narrow spectrum of respective different wavelengths with high separation resolving power. Three-fold RGB-separated exposures of an individual image are provided. Each exposure only employs those wavelengths on which the layers are associated with the image. The photosensitive layer may react on a certain wavelength, obtaining a pigmentation during photographic development, which also absorbs exactly this wavelength with high separation resolution power. The wall may be transilluminated with the RGB-components, which correspond in their wavelength to the respective image to be illustrated.

The most important new points are the different optical mediums in the system, the computer exposure and calculation of the pseudoscopic image for every individual mini projector and the back light system.

DETAILED DESCRIPTION OF THE PREFERRED EMBODIMENTS

Figure 1:
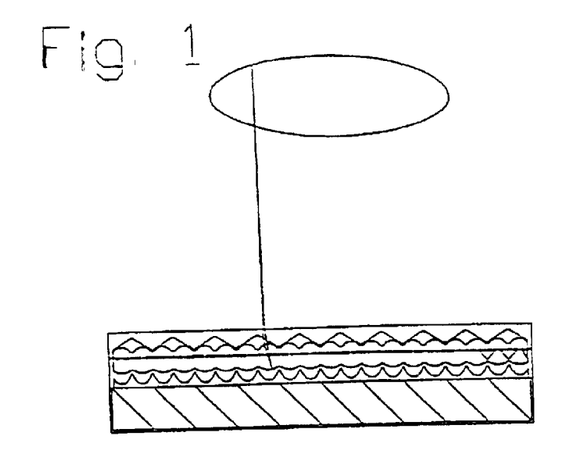
FIG. 1 is a cross section view of a first embodiment of the apparatus according to the present invention.
Figure 2:
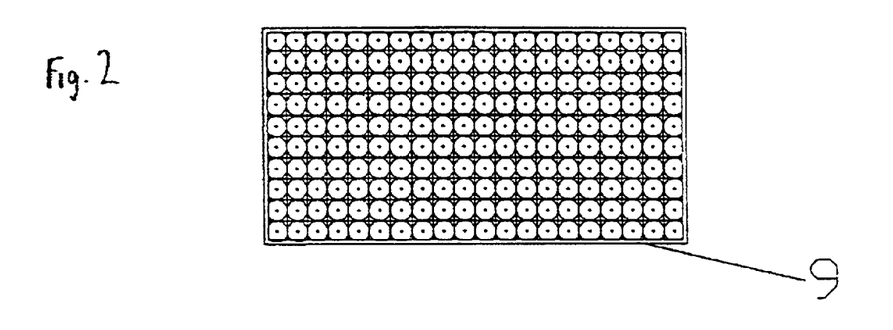
FIG. 2 is a top plan view of the apparatus of FIG. 1.

Generally, FIG. 1 shows direct exposure of an object without a computer controlled exposing machine, whereas FIG. 2 shows an exposing machine 18 with a monitor image 21 and an exposing projector optical objective.

Figure 3:
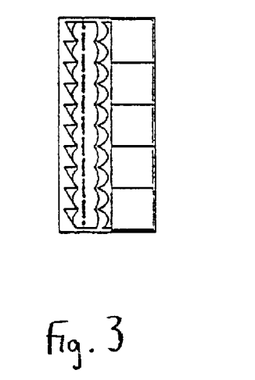
FIG. 3 is an end view of the apparatus of FIG. 1.
Figure 4:
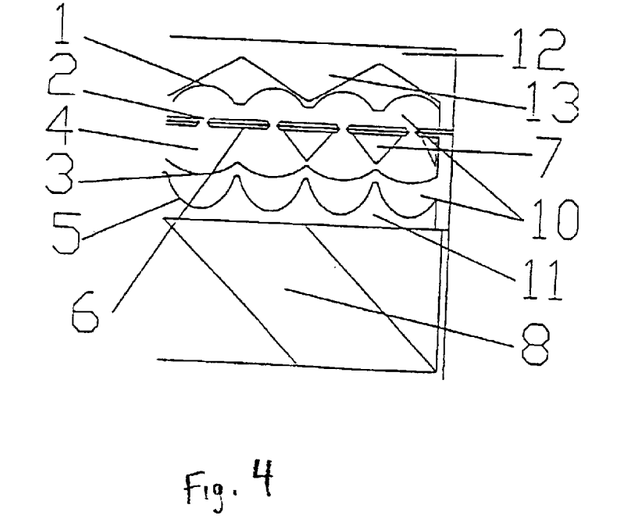
FIG. 4 is an enlargement of a portion of the apparatus shown in FIG. 1.
Figure 5:
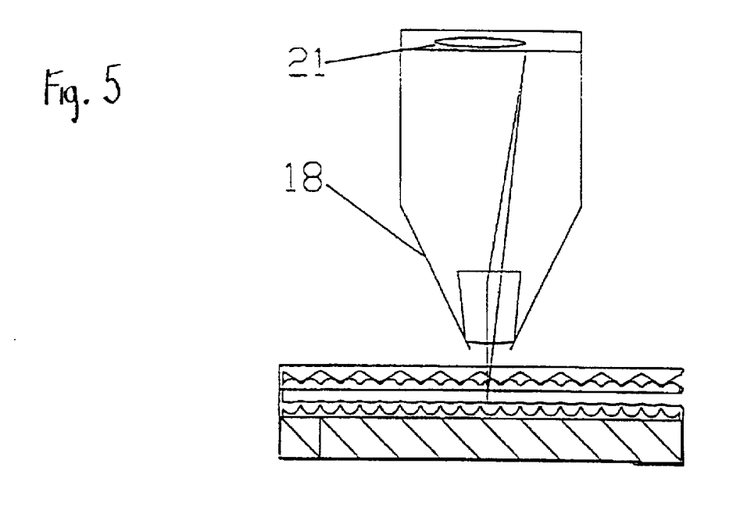
FIG. 5 is a cross section view of a second embodiment of the apparatus according to the present invention.
Figure 6:
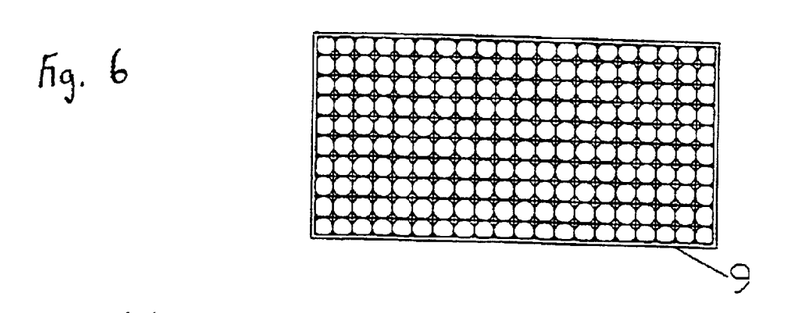
FIG. 6 is a top plan view of the apparatus of FIG. 5.
Figure 7:
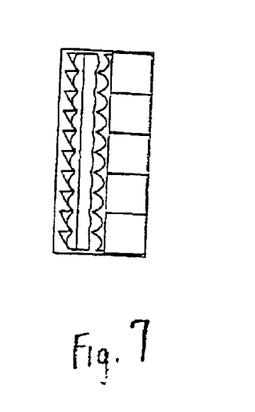
FIG. 7 is an end view of the apparatus of FIG. 5.
Figure 8:
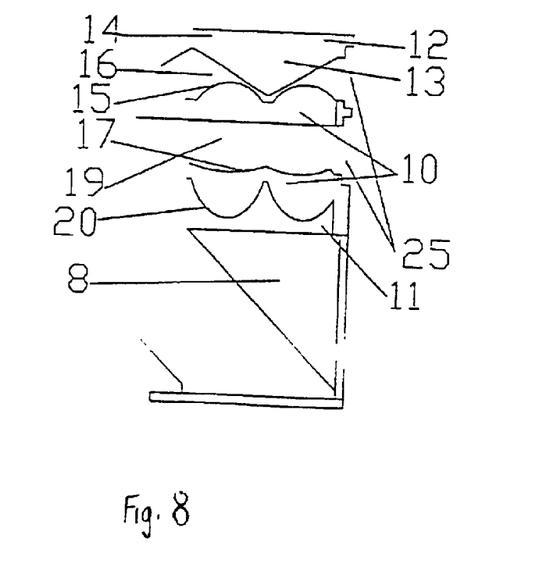
FIG. 8 is an enlargement of a portion of the apparatus shown in FIG. 5.
Figure 9:
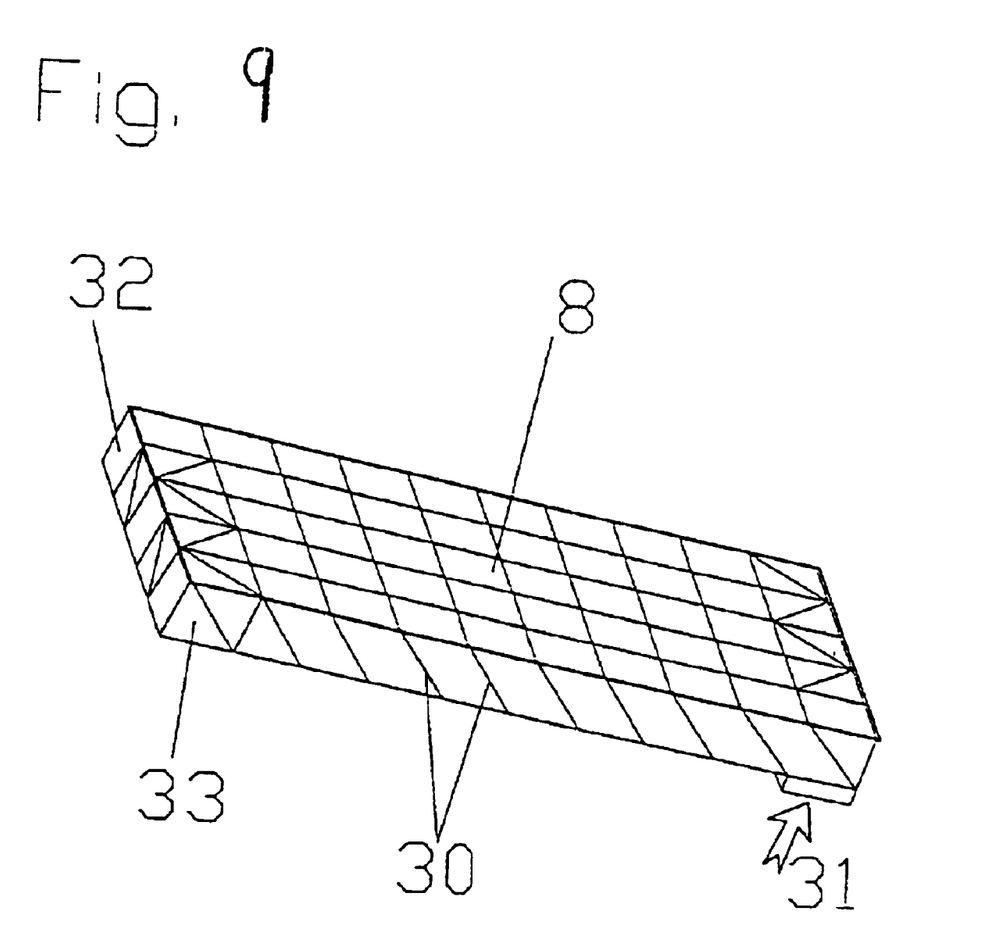
FIG. 9 is an enlarged perspective view of the prism system of the present invention.

FIG. 3 shows the system of prisms for delivering the parallel back light. FIGS. 1 and 2 show system 8 as part of the apparatus.

Unless otherwise noted, the discussion that follows is applicable to the embodiments of both FIGS. 1 and 2.

Each individual projector has a diaphragm aperture 2, at least one lens surface 1, at least one curved photo coated imaging surface 3, and a space between lens and the imagines surface 4 having at least two different optical substances, for example, one fixed and one separate liquid substance.

The optical components should be arranged such that an image in front of each individual projector can be projected on the photo coated imaging surface inside the projector. A computer integrated exposing process and apparatus 18 is used in the second embodiment in order to expose each individual projector with an individual computer calculated picture 21, one after each other. This includes a "recording projector" including some of the above optical components and a "showing projector" including some of the above optical components. The optical components should be arranged exposure and during showing, such that a computer calculated picture on a monitor 21 can be projected on the imaging surface inside the projector during exposure, and can be projected out again when showing the image.

When exposing each individual projector with the respective picture, the computer calculates this picture. For the calculation of the image, the front picture scene and the back picture scene must be mapped on top of each other. One of them needs to be calculated by the computer in reverse, pseudoscopic perspective. The computer may need to perform some further adjustments for correcting any errors caused by the optical system.

Some construction types need the second optical medium to be filled and emptied during the exposure and development process. The respective gaps and openings 19, 25 are provided.

The photo coated imaging surface may need to be developed photographically through an access space.

When showing the image, a back light system 8 is directing a number of point light sources to a parallel light front in a first step. This parallel light front is hitting the showing projector from the back. At least one lens surface 5 behind the imaging surface is focusing or spreading the parallel light from the back in a second step, in order to focus the light through the photo coated imaging surface 3 onto the diaphragm aperture 2, through the outer lens 1 and into open space. The two steps can also be performed by one single lens surface.

The properties and functions of the device are explained from the perspective of a single mini projector. The integration of many such mini projectors to lens plates and rectangular modules 9 is described below.

The invention is further computerized by integrating a computer and LCD display layers on the picture module itself. This enables the creation of short movie clips, whole movies or even interactively changing movies of the 3D scene.

The order in which the components should be placed is, first, the spherical lens surface at the front 1, followed by the diaphragm aperture 2 behind the lens. The spherical photo coated imaging surface 3 is placed behind the diaphragm 2 and two different optical mediums may be used for the front side of the diaphragm to the front lens and the back side of the diaphragm to the imaging surface 4. The aspheric lens 5 should be placed at the back such that any type of light arriving from behind is focused through the photo layer directly on the diaphragm aperture.

Back light from point light sources can be focused on the multitude of diaphragm apertures 2 by replacing the aspheric lens plate 5 with an optical plate with Fresnel-type aspheric lens structures. The aspherical structures focus the light directly from the single point light sources and do not need an intermediate step where the light is set parallel first. Although not shown, apertures may also be provided in the apparatus of FIG. 2. Conversely, the embodiment shown in FIG. 1 may require apertures.

The apparatus also allows the opening and closing of the diaphragm aperture inside the picture module from the outside by moving an additional integrated diaphragm plate with magnets 7. The magnets 7 and movable diaphragm are only useful for the non computerized exposure process of picture modules shown in FIG. 1.

As a variation, no diaphragm 19 inside the optical picture module be used. The image is focused and mapped onto the imaging surface by other optical means. The correct projection of the image is supported by the precisely focused back light system 8.

An optical system with prisms may be provided.

Many different optical systems delivering parallel back light can be used.

The optical system spreads a parallel light source 31 to a wide parallel light front by gluing many rhombic prisms 8 beside each other and one over each other and by applying further cuts and mirror surfaces 30. The light passes through the prism system and always reflects a fraction of the light to the front. At the corners of the system 33, light is also reflected to the side.

A multitude of individual mini projectors are combined in rectangular modules 9. The optical elements like the lenses 10 are now combined to optical plates containing the optical elements in a grid. The modules containing different layers of the optical plates should be of a handy size and can also contain other technical features, like retaining snaps between the optical plates or openings 25 to give access to the photo layer inside. The modules are also referred as picture modules.

During exposure of the photo layer, the space 11 behind the photo layer should be filled with a light absorbing substance or device to avoid disturbing reflections and diffused light falling on neighboring imaging surfaces. The substance can be an opaque liquid if the picture module is a compact style and the space behind the photo layer can not be accessed in an other way. If the photo layer is open accessible during exposure, the module can simply be laid on a dark textile ground.

FIG. 1 shows the lens plates 10 being from solid materials, whereas FIG. 2 has a gap 19 between the lenses 10, and another gap 16, which can both be filled with an optical liquid via the openings 25. This variations can be applied to both exposing methods.

An optical plate 12 is arranged in front of the picture module, placing a diverting prism 13 in front of each front lens. Thus, the whole visual field of the image can be diverted to one direction or can be widened.

Two different modes of how to handle color in the system are described herein. In the first mode, each mini projector specializes in one of the colors red, green or blue. No color corrections need to be considered. In the second mode, a full color range is integrated into the mini projectors. Special care must be taken during construction, in order to correct the color errors of the optical system.

An additional lens plate may be placed in front of the picture module in order to increase the point resolution.

If the non-computerized process for exposing the lens wall is used, the original object needs to be converted into a reverse perspective image. This can be done by placing a reverse perspective filter wall (not shown) between the original object and the recording lens wall. Deviating bodies are placed in a grid beside and on top of each other. Each body includes a glass cube with mirror surfaces at the edges. Parallel to the wall plane in the center of the glass cube is a diaphragm with apertures at the point where the mirror planes cut each other. By moving the wall horizontally and vertically, the dot resolution can be increased.

A variation of the lens wall has an imaging surface 3 as a mirror on which the photo layer is placed. A single strong light source shines on the multitude of mirrors on the wall during reproduction. The computer exposes each individual imaging surface with a computer calculated image, which is calculated with respect to the future position of the reproduction light source.

The picture modules should be exposed by a computer controlled exposing machine. The unexposed light sensitive picture modules are kept in a light safe container. This container is docked onto the exposing machine, so that a mechanism inside the exposing machine can take out one or more picture modules and place them on a tray inside the machine. The individual mini projectors on the picture module are guided by a computer in front of the optical objective 18 with the computer screen 21 behind it. The computer calculates the respective picture and shows it on the screen. The computer opens and closes the diaphragm aperture of the exposing machine for the respective time, and guides the next individual mini projector in front of the optical objective. After exposing all mini projectors on the module, the picture modules are then placed back into the first or another container, or handed over to the developing machine.

After exposing the picture modules, they should be photographically developed with the respective photo chemicals using an automatic developing machine. The undeveloped light sensitive picture modules are kept in a light safe container, or handed over from the exposing machine. The container or the exposing machine is docked onto the developing machine, so that a mechanism inside the developing machine can take out one or more picture modules and place them into the respective photo chemical baths for the respective time. Liquid substances inside the module can be filled or emptied depending on the construction of the modules. After the module is developed, it is sealed, marked as developed, and pushed into another transport container in order to proceed with the next module.

The optical system of each individual mini projector may be enhanced in order to correct optical color error and other optical errors for increasing the image resolution. The front lens surface 1 should have another lens surface with a different reflective index behind it in order to correct any optical color error.

The aspheric lens surfaces 5 at the rear can also include many lens surfaces in order to correct optical errors or to adjust to the type of backlight system used. The aspheric lens surfaces can include of Fresnel-type fragments for a flat construction.

In order to remember several images on the individual imaging surfaces and to reproduce a short cyclic movement sequence of the overall image scene, the imaging surface 3 is coated with a plurality of different photosensitive layers. Three layers, red, green and blue ("RGB"), for each individual image are exposed and read out separately. The separation from the other layers are performed by the property of the light or other signals. The distinct wavelength of the used light can be the property of the light, used to address the particular layer during exposure and projection.

A cost efficient version of an embodiment is explained in details as the preferred embodiment. The importance of the required integrated graphic software is shown by explaining the functions of this software in details. Also, the resolution capabilities of the optical system are shown.

The present invention includes at least two embodiments. The first embodiment is optimized for image quality and is using an optical liquid for one of the optical mediums. The second, preferred embodiment is optimized for production cost and uses two different plastic materials as optical mediums.

This description of the preferred embodiment consists of the following parts and especially applies to the second embodiment discussed above:

The picture creation cycle

The lens wall module

The production of the lens wall module

The supporting structures
The exposing machine and developing machine
The related computer software and hardware
The production of the related computer software The Picture Creation Cycle of the Embodiment The future 3D image scene is designed with graphic software on a desktop computer and stored on a disk. For this, the customer should sketch the environment setting where the picture wall will stand. A similar virtual environment must be selected from a library of common environments and can be customized to the customer's sketch. Second, the customer should sketch the image scene with the 3D objects for the picture wall. A similar image scene and similar objects can be selected from a library of common scenes and objects and customized.

The raw design and customization can be performed by computer graphic artists located at any remote place. The fine tuning of the image scene in the computer can be performed together with the customer and less skilled computer graphic artists. The final scene is stored on disk.

The picture modules are exposed with the image scene stored on the disk, using the exposing machine. For this, the necessary picture wall modules are purchased and delivered to the place of the exposing machine. The picture wall modules are delivered in light safe recyclable boxes, which are docked onto the exposing machine. The disk with the picture scene must be inserted into the graphic computer of the exposing machine. A test exposure and development program for a single wall module is performed to test and reconfirm the exposure and development parameters. The remaining wall modules in the container are exposed. For this, one wall module is taken automatically from the light safe container and placed on a 2D movable tray inside the light safe body of the exposing machine. A black light absorbing layer is placed behind the photo layer of the wall module. The computer program controls the first lens of the wall module in front of the objective with the LCD monitor behind it. The computer calculates the picture for that particular perspective, and performs a number of other necessary corrections in this calculation. The diaphragm of the objective is opened and closed for the respective time and the procedure is repeated for the next lens on the module.

After finishing the wall module, it is marked on the side with the coordinates of the total lens wall for which it is being exposed. If all wall modules inside one container are exposed, the old container must be removed and a new container must be docked onto the exposing machine. The exposing machine can also hand over the ready exposed wall modules to the developing machine, if it is connected to the exposing machine.

The exposed picture wall modules are being photographically developed, sealed, and put into a transport container. For this, the light safe container with the ready exposed wall modules is docked onto the developing machine. The wall modules can also be handed over directly from the exposing machine. In this case, the two machines are docked onto each other. One wall module is lead automatically through the different photo chemical baths and rinses and is sealed, dried and placed into the transport container.

The ready developed picture wall modules in the transport containers are delivered together with other supporting structures and the LED layer to the final wall destination, where they are being mounted and swished on. A structure supplies a flat, stiff plane with a grid for tiling on the LED layer and the picture wall modules. The supporting structure also supplies the electricity for the LED layer. A controlling unit controls the amount of electricity for the whole wall depending on the environment light condition. If animations or multiple pictures are calculated into the picture wall image scene, the structure can have an additional moving mechanism with an electric engine for moving or rotating the whole wall slowly in one axis.

The supporting structures should be mounted with the LED layer, and the wall modules should be tiled onto the structure according to the coordinates written on the side of each wall module. Other extras, like a glass plate, can be mounted. The electricity control unit should be connected and the image wall can be switched on.

The Lens Wall Module

The module includes the front protection plate 12 preferably made from plexiglas and covering the whole front area of 10×28 cm². A layer hardened against scratches can be applied at the front side and diverting prisms and retaining sticks can be integrated at the bag side. The next two layers of lens plates 1, 2, 3 are divided into, for example, eight separate plates of each 5×7 cm² to increase the precision of the molding.

The first plate 1, 2 is injection molded from polystyrol with a reflective index of, for example, 1.590 and a dispersion value (v) of 30.8. The front lens 1 has a curvature radius of 2.5 mm. 100 (10×10) such lenses are placed on this plate of 5×7 cm². At the back side of this lens plate (between 1 and 2), another lens surface with a curvature radius of 1.02 mm is shaped towards the front lens surface.

The second plate 4 is preferably injection molded from plexiglas with, for example, a reflective index of 1.491 and a dispersion value (v) of 57.2. The back lens surface, which functions as the imaging surface, has a curvature radius of, for example, 6.25 mm. The front side of this lens plate is flat, with a black light absorbing diaphragm coating. The diaphragm apertures 2 have an opening radius of, for example, 0.56 mm for an optimum balance between the spherical aberration error and the bending errors caused by too small apertures. The aperture is placed exactly in the center of all the lens spheres.

The two lens plates are glued together precisely with an optical cement suitable for gluing together plastics, for example, the optical cement SK9 from EMS Summers Optical Company, which has a reflective index of 1.49 and an estimated dispersion value (v) of 55–60 in its solid state. The cement fills the front cave when the plates are glued together. The two plates glued together may have a thickness of 6.24 mm+2.5 mm+0.07 mm in the solid state. In this example, extra 0.07 mm increases the resolution by defocusing the image.

The two plastic materials and the additional lens surface between the two lens plates create the achromatic behavior and reduce the chromatic color error to a lower extend then the spherical aberration error. The round construction of the system maintains the same resolution for all viewing angles.

In optical simulation programs, the above settings create light dots on the image plane of around 0.0055 mm to 0.0065 mm diameter, with an average of 0.006 mm. With a horizontal viewing range of 70 degrees and a vertical viewing range of 50 degrees, the imaging plane per lens is around 7.2×5.1 mm², which can accommodate around 1200×850 dots. This resolution enables the use of LCD monitors with a resolution of 1280×1024 dots in full color, to be build into the exposing machine. The imaging lens surfaces 3 have a photo layer similar to common color sleight photo layers. The resolution capacity of such photo layers is almost twice the above resolution, which fits comfortably into the system.

The optical plate with spheric lenses (between 3 and 5) and the system for delivering parallel back light 8 is integrated in this preferred embodiment into one optical plate performing both tasks. The size of this optical plate spans the whole module of 10×28 cm². On the front side towards the photo coated imaging layers, a pattern of Fresnel-type spherical lens fragments is molded, which focuses the LED light from the back directly on the multitude of diaphragm apertures. On the back side of the plate, 32 white LED point light sources are laid into the plate. The position of the light sources and the spherical Fresnel lens patterns are calculated to be exactly dependent on each other. The edges of this optical plate is featured with inside mirroring surfaces. The LED's at the back side of the plate are supplied with electricity via a flat wire system, which gets the electricity from the supporting structure layer behind the modules. The last optical plate can be divided in two, in order to separate the LED's from the spherical Fresnel pattern surface. The two plates can later be simply snapped onto each other, when the wall modules are tiled on to the supporting structure with the LED layer. All the other above optical plaits are glued together with retaining straps.

All together, each module consists of 20×40=800 individual mini projectors. The size of the optical components can easily be scaled down by half to 2.5×3.5 mm², so that 3200 (40×80) mini projectors can be packed on one wall module. The number of used LED's per module and the exposing resolution of 1280×1024 pixels per mini projector can be maintained because the practical resolution capacity of the system is at least double.

The edges of the wall modules are asymmetrically designed in such a way that the diaphragm layer is overlapping when two modules are placed beside each other. This way, no light can leak through the edges. The edges of the wall modules also feature a surface in which the exposing machine can automatically print the respective coordinates of the module.

The Production of the Lens Wall Module

The shape of the moulds for the lens plates and the optical plates should be calculated by a computer, taking in consideration the shrinkage of the plastic material during the slow cool down period. The high precision mould should then be shaped by ultra-precision diamond turning CNC lathe machines, which are able to produce complex aspheric multi-curve designs. These machines are supplied, for example, by the British company Taylor Hobson Limited.

The different optical plates are then injection molded using the respective plastic material. After injection, the moulds are slowly cooled down. The third optical plate shold obtain a precision printing of the black diaphragm with the diaphragm apertures on its flat side.

The two lens plates should be precisely glued together with an optical cement, suitable to glue together optical plastics, for example, using the optical cement SK9 from EMS Summer Optical Company. Also, the reflective index and the dispersion value (v) need to correspond to the optical system because the glue is filling the front cave of the additional lens surface of the front lens plate. Because the tolerance of the thickness of the two plates being glued together is only very small, the gluing process should be performed by a machine which is actively controlling the pressure and the thickness of the two plates at different points. The shrinkage of the cement during the hardening process with the ultra violet light must be considered in this process. On the side with the imaging lens surfaces, the plate should obtain a positive (color slide like) photo layer. To apply this complex layer to the curved surface of the small loose modules, special care must be taken because a color photo layer typically consists of many different thin layers. The multitude of layers can be purred on the fast moving modules directly similar to the normal film layer production. Another way is to apply the photo layer indirectly to the curved surface through a flexible pre-processed layer. Yet another method to apply the multitude of thin layers on the curved modules is to rotate each module around its central axis and to apply a well dosed drop of the layer material on the fast rotating module. The rotational forces spread the layer relatively even on the curved surface.

Any uneven spreading patterns of the photo layer caused by the different technical layer applying methods can be corrected, to a certain extent during the individual image calculation by the computer of the exposing machine. After applying the photo sensitive layer on the imaging surface, all the future processes should be performed in light safe environments.

The eight small lens plates are glued onto the large front plate with retaining sticks. The back plate with the Fresnel-type structures is glued to the other side of the eight small lens plates, also with retaining sticks. Finally, the wall modules are stored in light safe containers.

A flat metal layer should be molded or shaped and snapped onto the back side of the LED carrying optical plate. The small construction type LED's should be laid into the gaps of the plate such that they receive electricity from the metal layer.

The LED carrying optical plate modules are mounted onto the supporting structures.

The Supporting Structure

The supporting structure should offer a large variety of shapes and different methods of fixing the structure to walls, windows, sealings and grounds. The structure must also supply different ways to move or rotate the wall slowly in one axis. Finally, the structure should supply electricity and a precise snap-on mechanism for the LED modules.

The Exposing Machine and Developing Machine

The exposing machine, as well as the developing machine, have docking ports at the front side and at the back side. The docking ports can either connect to a light safe module container, or to another machine for a direct hand over of the modules. The machines can therefore be connected behind each other.

Every exposing machine has one standard desktop computer with, for example, an OpenGL graphic card on top of its body for running the integrated graphic software and controlling the exposure process inside the exposing machine. The processes of the developing machine are also controlled by this integrated software.

The body of the exposing machine has two completely light safe areas. One integrates a large LCD monitor connected to the controlling graphic computer. The second area holds the $2d$ precision positioning bench moving the individual mini projector of the wall module to the lens objective. The second area also holds the different mechanisms for fetching the modules from the container, transport them and fix them onto the positioning bench. A diaphragm is placed on the picture module, leaving only an opening for the individual mini projector which is going to be exposed. The objective leading to the LCD monitor has another diaphragm aperture, which is only opened for the respective exposing time of the individual mini projector.

The objective for the LCD monitor includes a concave convex lens bowed towards the LCD monitor. In this example, the focal length is 150 mm and the diameter of the lens is around 42 mm as it is delivered from stock by Lions Photonics Holding.

The LCD monitor is placed around 15.1 cm away from the objective lens and the mini projector is placed as close as possible to the objective lens.

The computer moves one mini projector after another in front of the objective, calculates the exposure image, opens the objective diaphragm aperture for the respective time and proceeds with the next mini projector. After one module is finished, the transport, fetching and marking mechanisms mark the module coordinates on the side of the module, forward the old module to the outgoing docking port and fetch a new module for the exposure.

The developing machine consists of a light safe body with a number of transport and dipping mechanisms to lead the modules to the chemicals and rising baths. The functionality is very similar to common automatic photo development labs for color slide developments. The chemical storing and refreshing mechanisms are not further described here. Basically, the common used mini labs should be adapted to the shape of the modules and the automatic hand over, fetching, and placing of the wall modules into the above mentioned light save containers.

The Related Computer Software and Hardware.

In this embodiment, all of the computer tasks are performed by one integrated control and graphic software. This software is used to design and simulate the image scene as well as run and control the exposing and developing machines. The computer hardware necessary for this software is a standard desktop PC with an OpenGL 3D acceleration graphic card, running MS-Windows NT or later.

The software basis, on which the integrated software is programmed, is the Maya 3D animation development system sold by Alias-Wavefront, which is a partner of SGI Silicon Graphics Incorporated. The Maya system is the industry leading software for developing 3D animations in movies like "Star Wars", and its functionalities and graphic user interface can fully be customized with its own integrated script language. New functionality can be added with its programming interface. Only the OpenGL hardware rendering features of Maya can be used in this example because the software rendering and ray tracing is much to slow for the exposure process.

The integrated graphic software has its user interface and functionalities customized and extended in order to lead the user through the steps of image development, simulation, module exposure and development.

When starting the program, a single empty 3D window is open with some user interface elements. First, a suitable virtual environment must be loaded from a file list of common environments like streets or discotheques. These environments are necessary to simulate and understand the behavior of the new 3D picture wall. The environment includes many separate objects, and must be changed to the actual environment of the customers place. All the manipulation tools of the graphic system can be used for changing and creating new objects interactively.

The loaded and new created environment objects are all assigned to the environment layer of the graphic program. The program is placing different logical objects into different layers so that the objects of one certain layer can be hidden, shown in different colors, or made not accessible for manipulation. Once the environment objects are all fully customized, the environment layer is set to be non accessible for manipulation.

Second, the desired type and size of lens image wall is loaded from a file list of common lens image walls. The size of this lens wall object can be changed in steps of the size of the lens wall modules. The lens wall object can be moved to the place of the simulated environment, where the wall should also stand in the real environment of the customer. It is possible to place more then one lens wall object into the virtual environment. Each lens wall can later be created with the exposing machine, showing all the same 3D objects placed into the lens wall image layer.

Once the lens walls are all placed correctly, the lens wall layer is set to be non accessible for manipulation.

Third, a suitable basis for the lens wall image is loaded from a file list of common lens wall image scenes. Again, all the manipulation tools of the graphic system can be used for moving, changing and creating new objects interactively. All the loaded and new created objects are assigned to the lens wall image layer. New lens wall image objects can also be imported from a file list of common objects, like flowers or butterflies. The 3D objects can be moved anywhere in front or behind the virtual lens walls. Only the objects in the lens wall image layer will be seen on the future lens walls.

Animations can be defined for all objects. The animation information of the objects in the lens wall image layer is being used if the lens walls are set to include the animation. There are different options for calculating animation into the final image.

Animations in the environment layer are only for visual simulation purpose or for creating walk though paths of the camera view.

The lens wall image can have more then one layer. In this case, each layer can be defined to be one of many images, which can all be stored on a single lens wall. This option also needs to be set for the lens wall.

Finally, the whole project or individual objects can be stored on disk.

The software for the exposing machine is the same as for the design computer. First, the project is loaded from a file list of saved projects. Second, a virtual representation of the exposing machine must be loaded from a file list of known exposing machine types. Third, the lens wall which the user is planning to expose must be selected. A test exposure or final exposure must be triggered from the menu.

Now the exposing process opens an information window to show the steps of the process which are currently being carried out. First, the status of the exposing machine and the developing machine is checked. If everything is acceptable, the software controls the mechanisms in the exposing machine to take the first lens wall module out of the container and lays it under the LCD objective for exposure. The image for the first mini projector is calculated by the procedure desired below. All the layers except the lens wall image layer are set to be hidden. The camera position is moved to the point of view of the first virtual mini projector on the virtual wall module. The camera is set to the perspective of the mini projector. The clipping plane of the camera is set to almost zero. The back view perpendicular to the lens wall is calculated with the OpenGL hardware render mode in best possible quality, and the picture is stored in a buffer. The camera is now set to show the view in pseudo-scopic (reverse depth) perspective, and the front view perpendicular to the lens wall is calculated in the same way as the back view. The back view and the front view are now being laid on top of each other and buffered.

The buffered image is mapped on a plane in the graphic program where the texture mapping capabilities of the system are used for distortions of the picture to compensate for the distortion caused by the objective lens of the exposing machine. Brightness and intensity maps are laid on top of the picture in order to compensate for a number of different light intensity distribution errors. These errors are caused by repeating patterns in the backlight system, the uneven photo layer, different light intensities of the used LED light sources, or the general behavior of the lens system. Also, some further color corrections are performed. The completely calculated and corrected picture is now shown on the monitor of the exposing machine and the diaphragm aperture of the objective is triggered to be opened and closed for the respective time.

The software continues with the next mini projector with the same procedure until the module is fully exposed. The module is now marked with the coordinates and forwarded to the developing machine where the software also controls the developing process. If the test run was successful, the exposure of the complete container can be triggered.

The Production of the Related Computer Software

The Maya 3D graphic software system can be programmed with the MEL, Maya Embedded Language, as well as with the C-programming interface. The control of the devices in the exposure and the development machine can be programmed in C-Language interfacing with the Maya system. The customization of the "Maya" user interface is all made with MEL. Only very few functions can not be mastered with the above tools. These functions can be programmed by Alias Wavefront directly into the system and must be made available by MEL. The main function is the OpenGL rendering of an image in pseudoscopic perspective. Pseudoscopic perspective means that every object that is far away, covers up and hides the close objects. This is exactly opposite to the normal world. This effect is achieved within OpenGL by simply reversing the so-called DepthTest. This small change must be a property flag of the camera from which the image is rendered. Other functions can facilitate the buffering and further use of rendered images and the merging of buffered images.

What is claimed is:

1. An apparatus for producing an integral photographic image of an object, comprising:
   a plurality of image projectors located in a grid, at least some of the plurality of image projectors being arranged horizontally and vertically adjacent to one another,
   wherein each of the plurality of image projectors include
      at least one lens with a lens surface,
      at least one curved photo coated imaging surface,
      at least one diaphragm aperture,
      the at least one lens and the at least one imaging surface defining a space, at least one optical substance being in said space,
      said image projectors being arranged such that the image of the object projects on the at least one photo coated imaging surface; and
   a backlight system having means for directing light through the at least one photo coating imaging surface and the at least one lens surface.

2. The apparatus of claim 1, further comprising a computer with a monitor, said projectors being arranged such that a computer calculated picture on the monitor is projected on the imaging surface during exposure and projected out during showing, the computer exposing each projector with an individual computer calculated picture one after another, the computer calculating a special perspective of the individual computer calculated picture and adjusting any errors.

3. The apparatus of claim 2, further comprising an LCD display layer integrated on the projectors for maintaining image information, the computer controlling the LCD layer.

4. The apparatus of claim 1, wherein each of the projectors include a front and a rear, the at least one lens surface being a spherical lens surface arranged at the front of the lens surface, the diaphragm aperture being arranged behind the spherical lens, the curved photo coated imaging surface being arranged behind the diaphragm aperture,
   each of the projectors further comprising an aspheric lens surface arranged behind the imaging surface for focusing parallel light from the rear of the projectors into the diaphragm aperture, and
   wherein the imaging surface and the diaphragm define a space filled with a liquid optical medium.

5. The apparatus of claim 4, wherein each of the plurality of projectors further include a diaphragm plate for opening and closing the at least one diaphragm aperture, the diaphragm plate including a spring for pushing the plate to one side and magnets such that the plate is adapted to be moved by interaction with electrical magnets.

6. An apparatus for producing an integral photographic image of an object, comprising:
   a plurality of recording projectors and a plurality of showing projectors, wherein at least one of each of the recording projectors and at least one of each of the showing projectors includes
   a protection glass layer
   at least one lens surface,
   at least one curved photo coated imaging surface,
   a diaphragm aperture,
   the at least one lens surface and the at least one imaging surface defining a space, at least two different optical substances in said space,
   said image projectors being arranged such that the image of the object can be projecting on the at least one photo coated imaging surface; and
   a backlight system having means for directing light through the at least one photo coating imaging surface and the at least one lens surface.

7. The apparatus of claim 1, wherein the backlight system includes a plurality of prisms for supplying parallel light to the plurality of projectors.

8. The apparatus of claim 7, wherein the prisms of the backlight system are rhomboid prisms assembled into a grid, said rhomboid prisms being glued together with glue having a higher refractive index than the rhomboid prisms, the prisms having partially and fully reflecting layers, the backlight system further including a light source being distributed relatively evenly amount grid segments of the grid, the light source supplying a light stream being partially reflected at glued prism surfaces by 90°, wherein the light stream flows a second time through the system after reaching a last rhomboid prism.

9. The apparatus of claim 8, wherein the grid has edge cells which reflect one part of the light stream 90° to one side and another part of the light stream 90° to the plurality of projectors, wherein the edge cells are formed by cutting a rhomboid prism twice diagonally, applying a fully and partially reflecting mirror layers to the surfaces, and gluing the two diagonal cuts together.

10. The apparatus of claim 4, the ashperic lens surface and the backlight system defines a space filled with an opaque liquid for preventing interfering reflections between individual projectors.

11. The apparatus of claim 1, further comprising an optical plate arranged in front of the plurality of projectors to direct the image toward spectators, the optical plate including
   an optical plate surface adjacent the projectors,
   a diverting prism in front of each of the plurality of projectors, at least some of the prisms including a curvature on one side to compensate for distortions, at least some of the prisms including alternating prism deviations to align an optimal visual field.

12. The apparatus of claim 1, wherein each of the plurality of projectors record and project in one of red, green, and blue.

13. The apparatus of claim 12, further comprising color filters and means for adjusting the imaging surface, the lens surface, and the photo layer to the corresponding color.

14. The apparatus of claim 1, wherein each of the plurality of projectors record and project the whole color spectrum.

15. The apparatus of claim 1, further comprising a lens plate having several lenses arranged in front of each of the plurality of projectors for increasing point resolution.

16. The apparatus of claim 1, further comprising a perspective conversion wall for converting a view of the objected into an inverted perspective view, the perspective wall including a plurality of individual bodies arranged in a grid, each body including a glass structure with two mirror surfaces embedded and cutting one anther vertically, and a diaphragm aperture at the intersection point of the two mirror surfaces, wherein both mirror surfaces stand vertically relative to a plane parallel to wall.

17. The apparatus of claim 16, wherein the conversion wall is suspended between two plates with a lubricating agent such that it is easily movable to increase resolution.

18. An apparatus for producing an integral photographic image of an object into an area, comprising:
   a plurality of image projectors located in a grid, at least some of the plurality of image projectors being arranged horizontally and vertically adjacent to one another,
   wherein each of the plurality of image projectors include
      at least one lens with a lens surface,
      at least one curved photo coated imaging surface having a mirror surface,
      a diaphragm aperture,
      the at least one lens surface and the at least one imaging surface defining a space, at least two different optical substances in said space,
      said image projectors being arranged such that the image of the object can be projecting on the at least one photo coated imaging surface;
   a strong light source shining obliquely onto the mirror side during reproduction to project images on the mirror surface into the room; and
   a computer for calculating the image with respect to the position of the light source.

19. An automatic exposing machine for exposing individual image modules of an integral photography apparatus, each of the individual modules having at least one diaphragm aperture, at least one lens surface with a lens, at least one curved photo coated imaging surface, the at least one lens surface and the at least one imaging surface defining a space for at least one optical substance, the machine comprising:
   a module reservoir, a precision track, a large exposure screen, an objective, a diaphragm aperture, and a controlling computer, the image modules being automatically taken from the reservoir, the image modules being put on the precision track and being guided by the computer in front of the objective of the large exposure screen, the computer calculating the image, opening and closing the diaphragm and continuing the next module.

20. The automatic exposing machine of claim 19, further comprising means for taking image modules not yet developed from a reservoir and developing them without light, said development means including means for filling or emptying liquid substances in the module, means for sequentially introducing photo developing chemicals into the modules, means for sealing the modules, means for marking the modules as developed, and means for pushing the modules into the reservoir and continuing with the next module.

21. The apparatus of claim 1, further comprising additional lenses to increase image resolution, wherein the additional lenses have a shape and reflective index such that the additional lenses correct any color error, opening error, and imaging errors.

22. The apparatus of claim 1, further comprising means for memorizing several images on the imaging surfaces for reproduction of a short cyclic movement sequence of an overall imaging scene, the memorizing means including a plurality of photosensitive layers being coated on the imaging surfaces, the plurality of photosensitive layers having individual red, green, and blue layers, means for exposing each individual image to the red, green, and blue layers, and means for reading a signal produced in response to the exposure.

23. A process for producing a large integral photography image of an object with a plurality of image projectors located in a grid and having at least one diaphragm aperture, at least one lens with a lens surface, at least one curved photo coated imaging surface, the lens and the imaging surface defining a space for optical substances, the process comprising:
   recording the image with a recording projector; and
   showing the image with a showing projector,
   at least one of the recording and showing step including
      arranging the image projectors such that the image is in front of each of image projector and can be projected onto the photo coated imaging surface,
      arranging the image projectors such that a computer calculated picture on a monitor can be projected on the imaging surface inside the projector and can be projected out,
   exposing each projector with the computer calculated picture one after another,
   calculating a special perspective of the image by a computer,
   filling or emptying the spaces with the optical substance,
   adjusting any errors, and
   developing the photo coated imaging surface through an access space.

* * * * *